United States Patent
Weng et al.

(10) Patent No.: US 9,424,514 B2
(45) Date of Patent: Aug. 23, 2016

(54) SYNAPSE MAINTENANCE IN THE DEVELOPMENTAL NETWORKS

(71) Applicant: Board of Trustees of Michigan State University, East Lansing, MI (US)

(72) Inventors: Juyang Weng, Okemos, MI (US); Yuekai Wang, Shanghai (CN); Xiaofeng Wu, Shanghai (CN)

(73) Assignee: Board of Trustees of Michigan State University, East Lansing, MI (US)

(*) Notice: Subject to any disclaimer, the term of this patent is extended or adjusted under 35 U.S.C. 154(b) by 263 days.

(21) Appl. No.: 13/949,995

(22) Filed: Jul. 24, 2013

(65) Prior Publication Data

US 2014/0032461 A1    Jan. 30, 2014

Related U.S. Application Data

(60) Provisional application No. 61/675,504, filed on Jul. 25, 2012.

(51) Int. Cl.
| | |
|---|---|
| *G06F 15/18* | (2006.01) |
| *G06N 3/08* | (2006.01) |
| *G06N 99/00* | (2010.01) |
| *G06N 3/063* | (2006.01) |
| *G06N 3/04* | (2006.01) |

(52) U.S. Cl.
CPC .............. *G06N 3/088* (2013.01); *G06N 3/049* (2013.01); *G06N 3/04* (2013.01); *G06N 3/063* (2013.01); *G06N 3/08* (2013.01); *G06N 3/082* (2013.01); *G06N 99/005* (2013.01)

(58) Field of Classification Search
None
See application file for complete search history.

(56) References Cited

U.S. PATENT DOCUMENTS

2010/0312730 A1    12/2010    Weng et al.

OTHER PUBLICATIONS

Synapse Maintenance in the Where-What Networks Yuekai Wang, Xiaofeng Wu, and Juyang Weng 2011—IEEE.*
Brain-Like Learning Directly from Dynamic Cluttered Natural Video Yuekai Wang, Xiaofeng Wu, and Juyang Weng 2012—www.cse.msu.edu.*

* cited by examiner

*Primary Examiner* — Kakali Chaki
*Assistant Examiner* — Ababacar Seck
(74) *Attorney, Agent, or Firm* — Harness, Dickey & Pierce, P.L.C.

(57) ABSTRACT

The developmental neural network is trained using a synaptic maintenance process. Synaptogenic trimming is first performed on the neuron inputs using a synaptogenic factor for each neuron based on standard deviation of a measured match between the input and synaptic weight value. A top-k competition among all neurons then selects a subset of said neurons as winning neurons. Neuronal learning is applied only to these winning neurons, updating their synaptic weights and updating their synaptogenic factors.

60 Claims, 5 Drawing Sheets

SYNAPSE MAINTENANCE IN THE DEVELOPMENTAL NETWORKS

CROSS-REFERENCE TO RELATED APPLICATIONS

This application claims the benefit of U.S. Provisional Application No. 61/675,504, filed on Jul. 25, 2012. The entire disclosure of the above application is incorporated herein by reference.

FIELD

The present disclosure relates generally to neural networks, and more particularly to a class of neural networks known as developmental networks (DN) that are developed fully autonomously, within the skull of the network, and thus without a priori configuration by the network designer.

More specifically, the present disclosure relates to a synaptic maintenance technique useful in improving performance of developmental networks.

BACKGROUND

This section provides background information related to the present disclosure which is not necessarily prior art.

Neural networks represent a class of artificial intelligence whereby programmed computers perform pattern recognition, make predictions and/or provide response to input stimulus. While fundamentally machine in nature, neural networks have properties that mimic biological systems or are inspired by biological systems such as the human brain. Neural networks are useful in a wide variety of applications where input stimuli are used to train the network, so that over time, the network is able to "recognize" patterns it has previously encountered.

While some neural networks can be custom-configured to match the needs of a particular problem, the present disclosure is concerned with developmental networks that are not architecturally configured by the network designer to match the intended purpose. Rather, the developmental network is more akin to un-molded clay that becomes adapted to its special purpose through the learning process. The network designer has no direct access to that clay, but instead must rely on the network to configure itself through training. The developmental network is sometimes referred to as a "skull-closed" network, to convey the sense that the network designer does not have direct access to the neurons, just as a human teacher has no direct access to the neurons inside the student's brain.

To train a developmental network by brute force can take a very long time. One can liken the process to the way the human genome evolved over many thousands of years. The DNA molecule that defines each of us today is the result of millions upon millions of copy and clone operations that occasionally mutated to discover a "better" configuration, which then succeeded where the earlier configurations failed. Thus eventually our genome has "learned" how to make the proteins that define our bodies.

Interesting as the human genome analogy may be, it is clearly not practical to design an artificial intelligence system that must take many thousands of years to learn a desired behavior. Thus techniques are needed to speed up the process.

SUMMARY

This section provides a general summary of the disclosure, and is not a comprehensive disclosure of its full scope or all of its features.

The present disclosure describes a process that will significantly speed up the neural network development process. Called synapse maintenance, the disclosed process allows developmental neural networks to be trained much more quickly and with greater accuracy than was possible before. The synapse maintenance technique may be applied across a wide variety of different practical applications. The present disclosure will primarily focus on the image recognition problem, of how to recognize one of a plurality of different objects (or people's faces) when those are present in a cluttered background scene. However, many other applications are also possible.

The synapse maintenance technique addresses several problems conjunctively. Among these problems are the problem of learning and recognizing generalized objects in cluttered scenes, without pre-segmentation for training, the problem of performing incremental semi-supervised learning, and the problem of how to determine recognition and segmentation (location and contour).

Disclosed here is a computer-implemented method of training a neural network that uses a processor and a non-transitory computer readable memory coupled thereto to implement a neural network comprising a plurality of interconnected neurons each having at least one input and at least one synaptic weight value and being arranged in a data structure defining:

(1) an X area coupled to communicate data with a sensory input device;
(2) a Y area coupled to communicate data with said X area; and
(3) a Z area coupled to communicate data with said Y area and further coupled to a circuit through which training data are input.

The processor is programmed to perform synaptogenic trimming on the at least one input of said plurality of interconnected neurons in at least one of said X, Y and Z areas using a synaptogenic factor for each neuron based on standard deviation of a measured match between the input and synaptic weight value. The processor then conducts a top-k competition among all neurons in at least one of said X, Y and Z areas to select a subset of said neurons as winning neurons. Neuronal learning (e.g., Hebbian learning) is then applied only to the winning neurons, to update the synaptic weight values for said winning neurons. The synaptogenic factor for each winning neuron is also updated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Introduction to Autonomously Developed Neural Network

The computer-implemented neural network shares certain similarities to the human brain, although the technological implementation is, of course, quite different. For example, in the human brain, synaptic maintenance seems to be conducted by every neuron in the brain. Each neuron, generated from neurogenesis (mitosis), autonomously decides where in the network to connect. Similarly, in a computer-implemented developmental network (DN), each neuron does not have a pre-selected feature to detect. The role of each neuron is dynamically determined through its interactions with other neurons, through a process known as autonomous development. However, heretofore there has been no way to effectively implement synaptic maintenance.

Where the analogy between the human brain and the neural network is useful, the following description will draw upon such analogies. However, it should be understood that the developmental neural network disclosed here is not a naturally occurring biological system like the human brain. Rather, the developmental neural network is a machine, implemented using computer processor technology.

A key aspect of the computer-implemented developmental network lies in the process by which the network is configured: network configuration occurs autonomously, inside the "skull" of the network. The network designer can interact with the developmental network during its configuration, but only via the external environment: that is, through the sensory end and the motor (effector) end of network. These ends alone serve as input ports and output ports through which the designer interacts with the network, to train it for its intended purpose.

Through the process of autonomous development, the network autonomously acquires skills to perform unknown tasks that the human teacher (or an external program) teaches it to perform. Such tasks might include, for example, detection and recognition of learned objects from unknown cluttered backgrounds. The sensory modality of the developmental network includes vision, audition, touch, smell, and taste. The effector modality of the developmental network includes all possible modalities, so long as they can be driven by a numeric vector. This includes all muscle controllable actions (e.g., limb motions and vocal tract action to generate voices), gland controllable actions (e.g., hormones), and computer-controlled actions such as responding to commands from the developmental network.

The synaptic maintenance technique described here will be explained in the context of a developmental neural network, where each neuron is not necessarily configured to detect a pre-selected feature. Rather, the role of each neuron is dynamically determined through its interactions with other neurons, through a process known as autonomous development. As such, the developmental network may be viewed as comprising a fully autonomous network within a closed skull.

Exemplary Developmental Network

Figure 1:
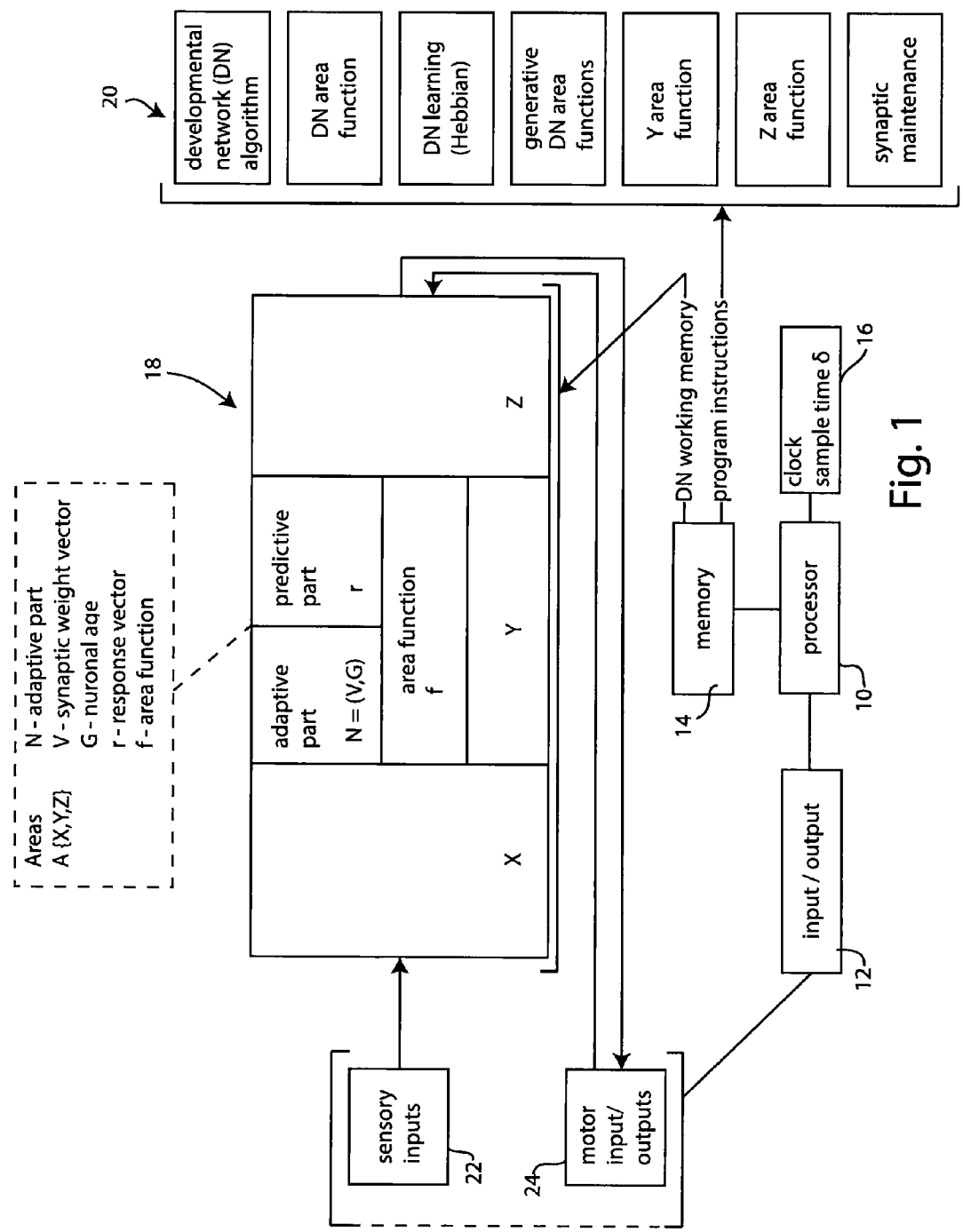
FIG. 1 is a block diagram showing a processor-based implementation of a developmental network.

Illustrated in FIG. 1, the developmental network (DN) is implemented by a programmed processor 10 which includes input/output circuitry 12, associated memory 14 and clock circuitry 16. The memory is configured as illustrated at area data structure 18 to define the basic components of the network as will be more fully discussed. The memory 14 also stores a set of program instructions, shown generally at 20, that are used to cause processor 10 to perform various operations needed for the functioning of the neural network in performing the synapse maintenance technique.

The clock circuitry 16 functions not only to mediate the operation of processor 10 but also to define the sampling time base by which the network updates its neurons. In this regard the developmental network is based on a discrete time formulation where the neurons update at the sampling time base frequency. The smaller the time base, the smaller the latency between a stimulus and the responsive action. As used herein, each unit of time has been denoted by integer numbers, i.e., t=0, 1, 2, .... It will be understood that each time integer corresponds to one increment of the sampling time base. While the time base selected will depend on the application and on the required latency, to put things in perspective, the human brain has a latency on the order of 100 ms, which is well within the capability of the neural network described here.

The developmental neural network is designed to receive data from a set of sensory inputs, shown generally at 22. These sensory inputs depend upon the application, of course. For purposes of illustrating the synaptic maintenance technique, the sensory inputs comprise inputs from one or more digital image sensors, such as image sensors from a CCD array within a digital camera. Of course, the neural network is by no means limited to use with optical inputs. Essentially, the input data may represent any kind of information that is capable of being sensed, measured or generated.

The developmental neural network is further designed to communicate with a set of motor inputs and outputs, shown generally at 24. In this regard, the term "motor" is used because it will be familiar to neuroscientists, where the human brain operates upon sensory input data and then controls the movement of muscles in order for the human to interact with the world. Thus the term "motor" is used here more by way of biological analogy, and should not be mistaken as referring to controlling of muscle tissue or even as requiring physical movement. In the context of the present disclosure, the motor input/outputs 24 are a special interface with the neural network that allows both input of information into the neural network and output of information from the neural network.

As depicted by the area data structure 18, the neural network is architecturally organized into three major areas, designated X, Y and Z. Area X communicates with the sensory inputs 22, area Z communicates with the motor input/outputs 24 and area Y is not directly coupled to either sensory inputs 22 or motor input/outputs 24. Area Y is thus effectively isolated within a closed "skull," where all configuration of the neurons within area Y are trained indirectly by virtue of being internally coupled to areas X and Z. Notably, area Y is a developmental network that is programmed through dynamic programming (DP).

Figure 2:
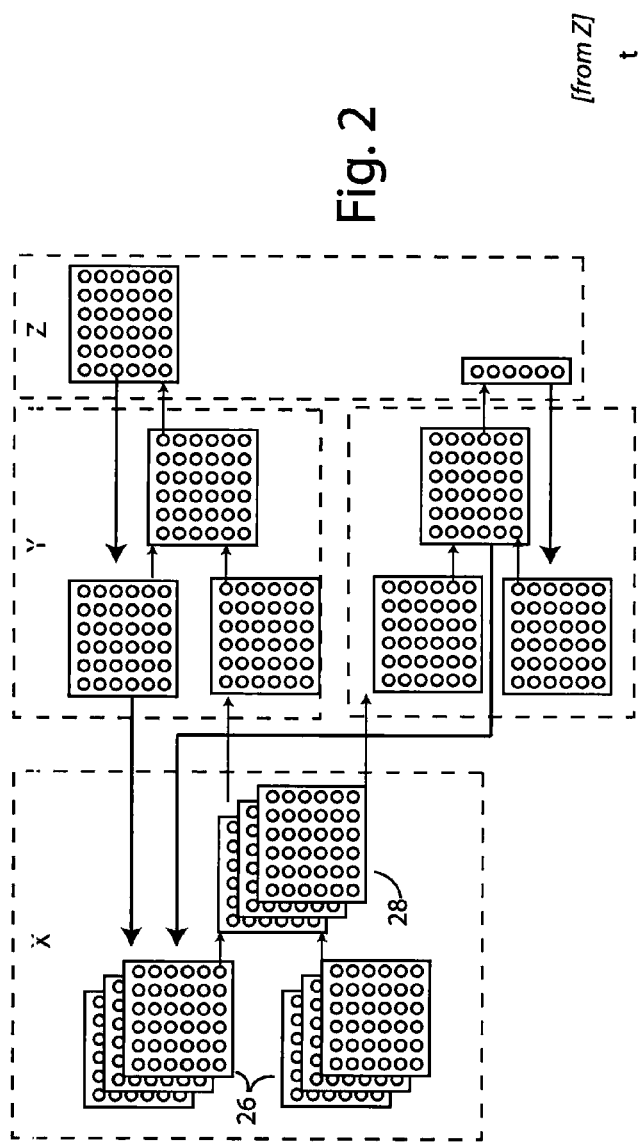
FIG. 2 is an example of a developmental network, showing exemplary details of how blocks of neurons are organized architecturally.
Figure 3:
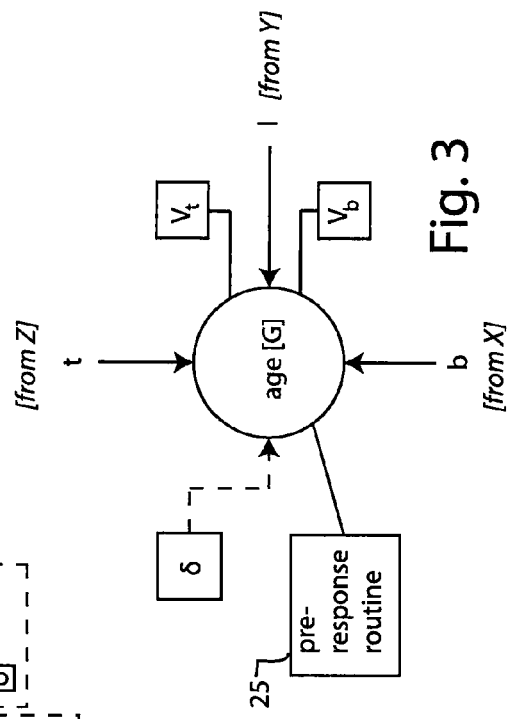
FIG. 3 is a diagram of a single neuron.

Before describing the area data structure 18 in greater detail, it may be helpful to refer to FIGS. 2 and 3, which give a more detailed example of how the areas X, Y and Z may be configured. As illustrated, each of the areas X, Y and Z may be made of multi-dimensional arrays of individual neurons (the individual neurons being diagrammatically shown as small circles in FIG. 2). The individual neurons are coupled for data communication with one another via synapse connections.

The individual neurons, and the multi-dimensional arrays into which the neurons are arranged, may be implemented as data structures in computer memory, where data communication between neurons is effected by the processor reading data values associated with one neuron, manipulating that data as required by the processes disclosed herein, and then writing data values to the data structures corresponding to other neurons that are connected to the first neuron through synapses. The synapses may be modeled within the computer memory as linked list data structures identifying which neurons are connected and in what relationship. A single exemplary neuron has been illustrated in FIG. 3.

In FIG. 3, three synapses have been illustrated, namely, a top-down synapse t, a bottom-up synapse b and a lateral synapse l. This illustration is merely exemplary. Other configurations are possible. Each neuron stores basic information represented by that neuron, including a value indicative of the age 'G' of the neuron and a set of values (capable of being represented as a vector) that store the synaptic weight associated with that neuron. In the illustrated neuron, the synaptic weight vector is represented by $V_t$ and $V_b$, corresponding to the weight values resulting from the respective top and bottom synapse connections.

The age of the neuron tracks how long the neuron has been operational, commencing at the time of its creation (neurons can be created as the developmental network runs, as will be discussed). The age value 'G' is updated incrementally with each "tick" of the time base clock.

In addition to storing basic values upon which the neural network operates, each neuron (from an object-oriented viewpoint) can also include basic operational routines by which that neuron updates itself. A pre-response routine 25 has been illustrated by way of example. It will be understood that the routines performed at the neuron level are actually performed by processor 10, as part of its low-level neuron housekeeping functions.

There are numerous different possible configurations by which neurons can be organized. FIG. 2 gives one example. In FIG. 2, the X area (configured to receive sensory input data) are arranged as multiple three-dimensional blocks of input neurons 26 that communicate with a three-dimensional block of intermediate neurons 28. The neurons in the Y area are similarly arranged, although being configured in two-dimensional arrays instead of three-dimensional ones. The Z area neurons are more simple still, being arranged as sets of single two-dimensional arrays. Of course, many other different configurations are possible, besides the one shown in FIG. 2.

With reference once again to FIG. 1, each area X, Y and Z may be architecturally configured to have different functional parts, including an adaptive part N, a predictive part r, and an area function f. These parts have been specifically illustrated in connection with area Y within FIG. 1. The adaptive part is a function of the synaptic weight vectors V and of the neuronal ages G for the neurons within that area.

Each of the three areas X, Y and Z is preferably specialized to a particular type of task. The X area serves as the interface to the sensory input(s). In principle, the X area can model any sensory modality (e.g., vision, audition, touch, etc.). The Z area serves both input and output. When the environment supervises Z (e.g., during training), the Z area serves as an input to the network. Otherwise, the Z area serves as an output, providing an output vector that could be used, for example, to drive effectors that act on the real world. For this reason the Z area may be described as tied to a "motor" function, analogous to how the brain would be tied to control the muscles.

The three areas X, Y and Z are interconnected in a hierarchical relationship. The X area provides bottom-up input to the Y area, while the Z area provides top-down input to the Y area. Thus the Y area serves as a bridge for areas X and Z. If one desired to map the disclosed X, Y, Z developmental neural network to a human brain, the X area might be used for all receptors; the Z area for all muscle neurons; and the Y area to model potentially any area in the brain, such as any Brodmann area. The Y area could, for example, be architected as multiple banks, each connected bi-directionally. For illustration purposes here, the most general X, Y, Z case has been illustrated, but it will be understood that more complex architectures are within the scope of the disclosed methods, FIG. 2 being one example thereof.

While the X and Z areas are typically devoted to input and input/output functions, respectively, the Y area serves multiple functions. A most basic function of the Y area is prediction. The Y area predicts the signals from areas X and Y through space and time (where space corresponds to a dimension or dimensions within the sensory input space, and time corresponds to discrete intervals of time measured by the clock circuitry 16). If the sensor input data are image data from a CCD camera, for example, the space dimension might correspond to the (x,y) coordinates of the CCD camera array, and time would correspond to the CCD reading interval.

As an aside, it is worth noting that the prediction function, in the general case, is not limited to the Y area. The other areas can also engage in the prediction function. Generally, prediction applies when a part of a bank is not supervised. Prediction also makes its bank less noisy, if the bank can generate its own signals, as in the case of the X area.

A secondary function of the Y area is to develop bias (likes or dislikes) to signals within the X and Z banks for which it serves as a bridge. Bias generally involves the process of increasing and decreasing synaptic weights so that some pathways are enhanced while others are atrophied. In this regard, the learned pathways may be viewed as a spine on which the connected neurons sit. As these learned pathways become enhanced, the spine grows in size and thus serves as a stronger connection between a certain input stimulus and the learned response.

The developmental network comprising the three basic areas X, Y, Z may be programmed to operate using the principles of dynamic programming (DP). One characteristic feature of the developmental network is that the network begins as a general-purpose structure that is assigned minimal, if any, a priori structure by the system developer. Rather, the structure begins as a generic network and incrementally learns its structure, autonomously, as the neural network is trained. In this sense, the network is of a "closed skull" design.

Figure 4A:
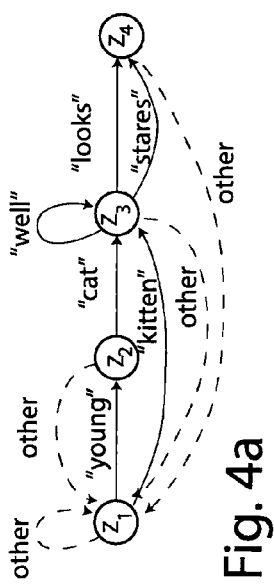
FIG. 4a is an exemplary finite automaton, configured to analyze a sequence of words.
Figure 4B:
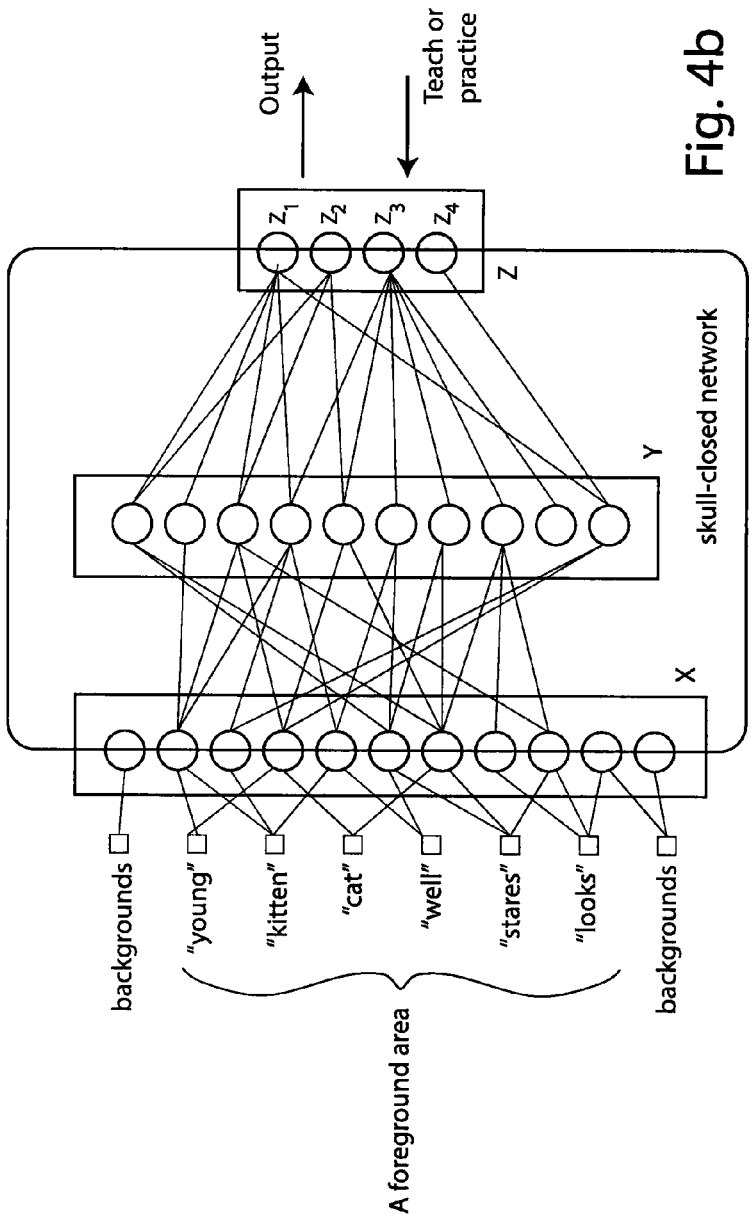
FIG. 4b is an exemplary developmental network, showing how the sequence of words used in FIG. 4a may be analyzed using a skull-closed network.
Figure 5:
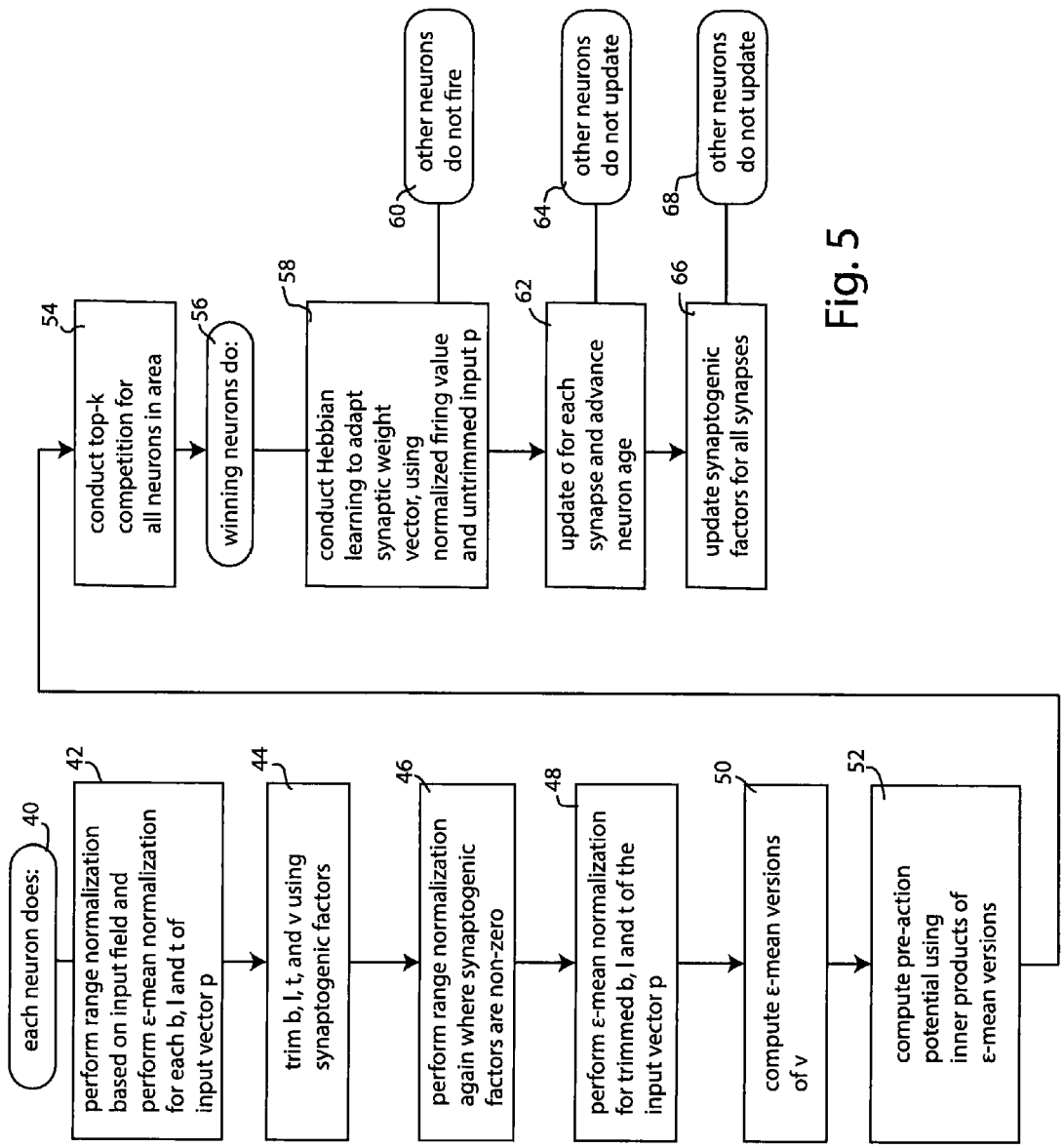
FIG. 5 is a flowchart diagram of the synaptic maintenance process.

To illustrate the nature of the closed skull design, and how it differs from a conventional, handcrafted symbolic network, compare FIGS. 4a and 4b. FIG. 4a illustrates an exemplary symbolic network, handcrafted in advance by the system developer to analyze text input. Specifically, the symbolic network of FIG. 4a is a finite automaton (FA) that can learn the different ways that the words "young, kitten, cat, well, stares, and looks" can be assembled to form grammatically correct sentences. The finite automaton would be trained by providing examples of correctly phrased sentences, and the network, over time, learns the probabilities of seeing those correct patterns.

By comparison, a dynamic network (DN) to accomplish the same task is illustrated in FIG. 4b. Note that the X area is coupled to the sensor inputs, in this case the different possible words, "young, kitten, cat, well, stares, and looks." Also coupled to the network are several nodes labeled "backgrounds." These correspond to other information that may appear in the data, but which are not part of the corpus the network is designed to analyze. The presence of this "background" information plays an important role in the synaptic maintenance process, as will be shown later. If the dynamic network were designed to analyze and recognize known objects within a visual field, the background might correspond to the scenic background made up of objects that are not relevant to the recognition purpose of the network.

In the dynamic network of FIG. 4b, note that the Y area is entirely contained within the closed skull. Unlike the finite automaton network of FIG. 4a, the Y begins life as a completely generic, untrained network, without any a priori handcrafting by the system developer. The only constraints are that the X area has nodes connected to certain sensory inputs, and the Z area can function in either an output capacity (supplying recognition outputs or predictions for use by other systems) or an input capacity whereby the network may be trained. Training is performed by supplying a specific sensory input, such as the word "cat," and by telling the network via the Z area that the input is "cat." Upon receiving this training, the network autonomously configures itself, by selectively adjusting neuron weights and by performing other internal processes so that the input pattern "cat" will be recognized or predicted in the future.

In general a dynamic network (DN) can incrementally learn any complex finite automaton (FA). It does so in a grounded fashion. It takes sensory input and produces predictive output all directly from the world outside the skull of the network. The success of the dynamic network to learn from its environment depends on the dynamic programming the network is given. Properly designed dynamic programming can learn a complex finite automaton quickly. By way of comparison, the human genome took thousands of years, through a long process of natural evolution, to "learn" the behavior that our biological species exhibits today.

The Developmental Network (DN) Algorithm

The present disclosure focuses on a synapse maintenance process that greatly improves dynamic programming used in dynamic networks. If more information on the dynamic network is desired, reference may be had to U.S. patent application Ser. No. 12/790,735, entitled "Neuromorphic Spatiotemporal Where-What Machines," filed May 28, 2010, and published as 2010/0312730 on Dec. 9, 2010, the entire contents of which are incorporated herein by reference.

The DN algorithm makes the following initial assumptions. Areas X and Z serve as the input areas; areas X and Z serve as the output areas. The dimension and representation of X and Y areas are selected based on the dimensionality of the sensors and effectors of the system with which the neural network is interconnected (e.g., a robotic agent or even a biological system regulated the genome). Y is skull-closed inside the brain and not directly accessible by the external world after creation.

The developmental network may be configured as a generative developmental network (GDN), where new neurons can be generated or instantiated, as needed. Such generation may be thought of as analogous to mitosis in biological systems. The basic developmental network algorithm (DN algorithm) will now be explained.

Initialization:

At time t=0, for each area A in {X, Y, Z}, the processor initializes its adaptive part N=(V, G) and the response vector r, where V contains all the synaptic weight vectors and G stores all the neuronal ages. For example, use the generative DN method discussed below.

Subsequent Input Processing and Learning:

At time t=1, 2, . . . , for each A in {X,Y,Z} the processor then repeats the following steps:

(a) Every area A performs new neuron generation (analogous to biological mitosis) if it is needed, and initializes the weight vector of each new neuron using its bottom-up and top-down inputs b and t, respectively.

(b) Every area A computes its area function $f$, described below, $$(r',N')=f(b,t,N)$$

where r' is the new response vector of A.

(c) For every area A in {X,Y,Z}, A replaces: N←N' and r←r'.

To simplify the remaining discussion, we assume that Y models the entire brain. If X is a sensory area, x∈X is always supervised. The z∈Z is supervised only when the teacher chooses to. Otherwise, z gives (predicts) effector output.

Put intuitively, like the brain, the processor performs the DN algorithm, which repeatedly predicts the output Z for the next moment. When the predicted Z is mismatched, a learning process proceeds to learn the new information from Z. There is no need to explicitly check for mismatches. Learning takes place automatically.

The generative developmental network (GDN) automatically generates neurons in the Y area. If (b, t) is observed for the first time by the Y area (the pre-response of the top-winner is not 1), Y adds a Y neuron whose synaptic weight vector is (b, t) with its neuronal age initialized to 1. This operation may be thought of as analogous to certain biological processes such as mitosis and cell death, spine growth and death, and neuronal recruitment.

The Area Function, Weight Vector and Pre-Response Processing:

The developmental network employs one or more processor-implemented area functions $f$ that each generate an area-specific response to stimulus. The synapse maintenance technique is part of the area function. In the preferred embodiment each area {X,Y,Z} uses the same area function. It is desirable that each area use the same area function $f$, to develop an area-specific representation and generate an area-specific response. Each area A also has a weight vector $v=(v_b, v_t)$. Its pre-response value is:

$$r(v_b b, v_t t) = \dot{v} \cdot \dot{p} \quad (1)$$

where $\dot{v}$ is the unit vector of the normalized synaptic vector $v=(\dot{v}_b, \dot{v}_t)$, and $\dot{p}$ is the unit vector of the normalized input vector $p=(b, t)$.

The inner product measures the degree of match between these two directions $\dot{v}$ and $\dot{p}$, because $r(\dot{v}_b, b, v_t, t)=\cos(\theta)$ where $\theta$ is the angle between two unit vectors $\dot{v}$ and $\dot{p}$. This enables a match between two vectors of different magnitudes (e.g., a weight vector from an object viewed indoor to match the same object when it is viewed outdoor). The pre-response value ranges in [−1, 1].

This pre-response is inspired by how each neuron takes many lines of input from bottom-up and top-down sources. It generalizes across contrast (i.e., the length of vectors). It uses inner-product $\dot{v} \cdot \dot{p}$ to generalize across many different vectors that are otherwise simply different as with symbols in a finite automaton. The normalization of the bottom-up part and the top-down part separately is for both the bottom-up source and top-down source to be taken into account, regardless the dimension and magnitude of each source.

To simulate lateral inhibitions (winner-take-all) within each area A, top k winners fire. Considering k=1, the winner neuron j is identified by:

$$j = \arg\max_{1 \leq i \leq c} r(v_{bi}, b, v_{ti}, t). \quad (2)$$

The area function dynamically scales top-k winners so that the top-k respond with values in (0, 1]. For k=1, only the single winner fires with response value $y_1=1$ (a pike) and all other neurons in A do not fire. The response value $y_1$ approximates the probability for $\dot{p}$ to fall into the Voronoi region of its $\dot{v}_j$ where the "nearness" is $r(\dot{v}_b, b, v_t, t)$.

Hebbian Learning:

All the connections in the developmental network are learned incrementally based on Hebbian learning: co-firing of the pre-synaptic activity $\dot{p}$ and the post-synaptic activity y of the firing neuron. If the pre-synaptic end and the post-synaptic end fire together, the synaptic vector of the neuron has a synapse gain $y\dot{p}$. Other non-firing neurons do not modify their memory. When a neuron j fires, its firing age is incremented $n_j \leftarrow n_j+1$ and then its synapse vector is updated by a Hebbian-like mechanism:

$$v_j \leftarrow w_1(n_j)v_j + w_2(n_j)r_j\dot{p} \quad (3)$$

where $W_2(n_j)$ is the learning rate depending on the firing age (counts) $n_j$ of the neuron j, $w_1(n_j)$ is the retention rate with $w_1(n_j)+w_2(n_j) \equiv 1$, and $r_j$ is the response of neuron j.

Hebbian learning may be altered as set forth below to allow initial state for automatic weight initialization. In other words, the processor is programmed to apply neuronal learning at a learning rate defined by algorithm, where the algorithm is modified to adjust the learning rate for said new neuron such that it learns at a rate differently from existing neurons.

The simplest version of $w_2(n_j)$ is $w_2(n_j)=1/n_j$ which corresponds to:

$$v_j^{(i)} = \frac{i-1}{i}v_j^{(i-1)} + \frac{1}{i}1\dot{p}(t_i), i = 1, 2, \ldots, n_j,$$

where $t_i$ is the firing time of the post-synaptic neuron j. The above is the recursive way of computing the batch average:

$$v_j^{(n_j)} = \frac{1}{n_j}\sum_{i=1}^{n_j} \dot{p}(t_i)$$

The initial condition is as follows. The smallest $n_j$ in Eq. (3) is 1 since $n_j=0$ after initialization. When $n_j=1$, $v_j$ on the right side is used for pre-response competition but does not affect $v_j$ on the left side since $w_1(1)=1-1=0$.

A component in the gain vector $y_j\dot{p}$ is zero if the corresponding component in $\dot{p}$ is zero. Each component in $v_j$ so incrementally computed is the estimated probability for the pre-synaptic neuron to fire under the condition that the post-synaptic neuron fires.

Specific GDN Area Functions:

As noted above, the present discussion has centered on a description of the Y area, as being the most general case. Thus in the above analysis the Y area was treated as modeling the entire brain. In a full implementation that includes separate X, Y and Z areas, the X area is a sensory area where neurons are always supervised (x∈X is always supervised). Similarly, the Z area is also supervised (z∈Z is supervised only when the teacher chooses to; otherwise, z gives or predicts effector output).

Because the Z area is responsible for handling input from a teacher during training, the area function for the Z is somewhat different from the more generic area function used by the Y area. Thus the below algorithms are described for the Y area function (algorithm 1) and the Z area function (algorithm 2). The two algorithms are comparable in many respects, with algorithm 2 including additional steps to support supervised learning. For simplicity, in the explanation of algorithms 1 and 2 below, we will consider k=1 for top-k competition.

Algorithm 1 (Y Area Function)
1. Every neuron computes pre-response using Eq. (1).
2. Find the winner neuron j using Eq. (2).
3. If the winner pre-response is less than 0.9999, generate a Y neuron using the input p as the initial weight with age 0. The new Y neuron is the winner for sure.
4. The winner neuron j increments its age: $n_j \leftarrow n_j+1$, fires with $y_1=1$, and updates its synaptic vector, using Eq. (3).
5. All other neurons do not fire, $y_i=0$, for all i≠j, and do not advance their ages.

Algorithm 2 (Z Area Function)
This version has k=1 for top-k competition within each concept zone.
1. If the dimension of Y has not been incremented, do:
  (a) Every neuron computes pre-response using Eq. (1).
  (b) Find the winner neuron j using Eq. (2). Otherwise, do the following:
  (a) Supervise the pre-response of every neuron to be 1 or 0 as desired.
  (b) Add a dimension for the weight vector of every neuron, initialized to be 0, which may be immediately updated below.
2. Each winner or supervised-to-fire neuron j increment its age: $n_j \leftarrow n_j+1$, fire with $z_j=1$, and updates its synaptic vector, using Eq. (3).
3. All other neurons do not fire, $z_i=0$, for all i≠j, and do not advance their ages.

The Y area function and the Z function are basically the same, except that the Z area can be supervised but the Y area cannot since it is inside the closed "skull". During the simple mode of learning discussed here, neurons responding to background data are suppressed (not attending), so that no neurons learn the background. Thus in FIG. 4b, the data supplied via inputs labeled as "backgrounds" would be suppressed by the algorithm.

Synapse Maintenance:

In the above DN algorithm, each synapse whose weight is controlled by the Hebbian learning is always connected. However, it will not always be true that the default sensory receptive field b, lateral receptive field l, and top-down motor receptive field t are appropriate. For example, if a neuron ends up detecting a view of a "cat," then the contour of that cat view may not exactly match the contour of the default sensory receptive field, which is typically a plain geometric shape, such as an octagon. Thus in the sensory receptive field, there will be input components that correspond to backgrounds against which the cat view appeared. The synapse maintenance algorithm performed by processor 10 (FIG. 1) is designed to cut such background synapse out.

Before providing a detailed explanation of the synapse maintenance algorithm, a general explanation of the motivation and an explanation of some data normalization concepts may be helpful.

Motivation

In general, a neuron may end up detecting a feature in the space of p=(b, l, t), but the default input field may contain components that are not related to the feature that the neuron detects. Such components may considerably degrade the accuracy of detection. Synapse maintenance is meant to appropriately weight each input component using what is referred to herein as a synaptogenic factor for each synapse. The synaptogenic factor dynamically determines the properties of a synapse spine (e.g., size), so that less reliably matched input components have a smaller spine (e.g., Mahalanobis distance), and those that hardly match at all are completely cut (e.g., the spine is retracted).

How does each neuron "know" which input component should be cut? The post-synaptic firing gives an important cue. Suppose that a neuron has an initial input vector p defined by all its spines where synapses sit. The algorithm would like to remove all the synapse components in p that are irrelevant to post-synaptic firing (e.g., cluttered background in vision), while minimizing the removal of those relevant components (i.e., a foreground object). Further, the parts from the foreground object that do not match well (e.g., the deformed parts) have smaller spines. The size of the spine or complete retraction of the spine is dynamically determined based on statistical scoring of the match, between the pre-synaptic activities and the synaptic conductance (weight).

All the mechanisms below are in-place—using mechanisms of a single cell. Each input is p=(b, l, t), where b, l and t represent bottom-up (from X), lateral (from Y) and top-down input (from Z), respectively. All the connections in p are assumed to be excitatory. Each feature neuron in Y also has inhibitory lateral connections. To avoid oscillations and slow convergence in the simulation by serial computer, caused by lateral inhibitory, the algorithm uses a top-k competition mechanism. The net effect of lateral inhibition is to allow few neurons to fire, so that most neurons that do not match well do not fire so that their memory meant for other neuronal inputs are well kept. The top-k mechanism finds top k winner neurons which fire and update.

We assume that neurons in Y, as the computational resources, are distributed uniformly across three characteristics: scale areas, location in each area, and depth at each location. Each scale area has a default scale size for the default sensory receptive field. Each location within each area has an integer depth of neurons, where neurons at different depths compete for detecting a feature (called a lobe component), for the image location and the default scale for the area. The default scale of each neuron is typically larger than the object scale that the neuron ends up detecting and recognizing, resulting in an initial over connection. The synaptic maintenance of a neuron dynamically fine-tunes the pattern of connections through all its synaptogenic factors, one for each spine.

Per-Input Range (Contrast) Normalization

Since synapse maintenance is a type of refinement, normalization is important to avoid otherwise undesirable effects, such as variation caused by changes in the environmental brightness in a visual detection system. Thus normalization processing is preferably performed on the sensory input data.

A sensory vector x consists of signals from an array of receptors. For an image $[x_{ij}]$ with r rows and c columns, the dimension is d=rc. For notational convenience, we denote an image as a sensory vector $x=(x_1, x_2, \ldots, x_d)$, a d-dimensional vector which lists the image rows one at a time, from the first row to the last. That is, $x_{(i-1)c+j}=x_{ij}$, i=1, 2, ..., r and j=1, 2, ..., c. This is called row-major mapping from an image to a vector. Any other mapping, e.g., column-major, is acceptable too.

The algorithm first performs range normalization so that all the values of each input vector $x=(x_1, x_2, \ldots, x_d)$ fill the entire range of 0 and 1. Suppose that $a=\max_{i=1}^{d}\{x_i\}$ and $b=\min_{i=1}^{d}\{x_i\}$. If a=b, report error: "constant input vector!". Otherwise, do the following $$x_i \leftarrow \frac{x_i - b}{a - b}$$

for i=1,2, ..., d.

After the range normalization, all vectors have a normalized range [0, 1] for all its components.

Per-Input ε-Mean Normalization

After each input vector x, y, z has been normalized using the above range normalization. Further normalization processes upon statistical components of the data are then performed. Depending on the particular architecture of the neural network, the various layers within the network may or may not receive input stimulus from all synaptic connections. By way of example, see the layered architecture of the exemplary network illustrated in FIG. 2.

All the mechanisms to implement the synapse maintenance algorithm are in-place, using mechanisms of a single cell. Each input is $p=(p_1, p_2, \ldots, p_d)=(b, l, t)$, where b, l, and t are bottom-up, lateral and top-down inputs, respectively. Therefore, depending on the particular architecture of the network, t may not be present in layer L4, b may not be present in layer L2, whereas l is the lateral input and is available for each layer. Similarly, each layer L3 neuron may have only 1 bottom-up input and 1 top-down input.

In the following, we assume that p=(b, l, t), but not including the inhibitory part of y which is implemented by the top-k competition mechanism.

Next, except for the case where b, l, or t is one-dimensional, we would like to remove the across-components mean in each part of b, l, and t, so that the mean across all components in the input vector b, l, and t does not affect the neuronal match.

However, this presents a problem for a vector whose components are almost constant (e.g., a natural image from a gray wall). Thus, we keep only a small perturbation as the standard deviation of quantization error. Let an input patch be $x \in R^d$, $x=(x_1, x_2, \ldots, x_d)$, where x is either b, l or t. Suppose that at each time $t_n$, x has a minimum pixel value 0 and maximum pixel value 1. Find the mean error ε of the digitization error. If each pixel value has 256 intensity values, the mean quantization error ε is assumed to uniformly distributed over [−δ, δ] with δ=1/256. $\epsilon^2 = E\sigma^2 = \delta^2/12$. Thus $E=\delta/\sqrt{12}$.

The algorithm computes the mean of the input x incrementally: m=0 and i=1; while i≤c, do $m \leftarrow ((n-1)m+x_i)/n$ and i←i+1. Then, perturb m←m−ε. Do the ε-mean normalization below, while we do not have any zero vector:

$$xi \leftarrow xi - m, i=1,2,\ldots,d$$

We can roughly expect:

$$Ex = \epsilon u$$

where u is a vector whose components are all one.

The new value of each pixel is such that the minimum in each new x is bounded below by −1+ε and bounded above by 1+ε. It can be proved that the Euclidean norm of an ε-mean normalization vector is never zero. When all the components of x are the same (without doing the above range normalization), its ε-mean normalization vector has a length (Euclidian norm) $\epsilon\sqrt{d}$. The algorithm performs the same computation for lateral input y and top-down input z.

It is important that the $\epsilon$-mean normalization is computed before the synaptic maintenance below, since the $\epsilon$-mean normalization is based on the default input fields, not the trimmed ones.

Expected Uncertainty

In biological systems the known synaptogenic factors includes acetylcholine, agrin, astrocytes, neuroligins, SynCAM and C1q. For example, it has been shown that partial blockage of the acetylcholine receptor (AchR) leads to retraction of corresponding presynaptic terminals. Thus scientists believe that Ach signals expected uncertainty; in other words, "this neuron predicts this pre-synaptic line pretty well."

Suppose that the input to a neuron is $p=(p_1, p_2, \ldots, p_d)$ and its synaptic weight vector is $v=(v_1, v_2, \ldots, v_d)$. Since each synapse sits on its spine, we may consider that this synaptic weight vector to be the composite effect of both the spines and the synapses.

In biological systems, Acetylcholine (Ach) originates from the basal forebrain, and this seems to indicate expected uncertainty, among other possible use by the brain. The computer-implemented algorithm presented here models how to neuromorphically measure expected uncertainty. When top-k neurons fire with value y, its synapse indicates the mean of the pre-synaptic activities $x_i$.

$$v_i = E[yp_i/\text{the neuron fires}]$$

using amnesic average. The standard deviation of match between $v_i$ and $p_i$ is a measure of expected uncertainty for each synapse i:

$$\sigma_i = E[|v_i - p_i| | \text{the neuron fires}].$$

is the expected uncertainty for each synapse, modeled by Ach. Mathematically, $\sigma_i$ is the expected standard deviation of the match by the synapse i.

However, the algorithm must start with a constant value and wait until all the weights of the neuron have good estimates of $w_i$. Suppose that $\sigma_i(n)$ is $\sigma_i$ at firing age n. Every synapse starts with the standard deviation of uniform distribution in $[-\delta, \delta]$, when $n \leq n_0$. Then, the synapse i starts with normal incremental average. Finally, the algorithm uses a constant asymptotic learning rate to enable the standard deviation to continuously to be plastic. The expression is as follows:

$$\sigma_i(n) = \begin{cases} 1/\sqrt{12} & \text{if } n \leq n_0 \\ w_1(n)\sigma_i(n) + w_2(n)|v_i - p_i| & \text{otherwise} \end{cases} \quad (4)$$

where $$w_2 = \frac{1+\mu(n)}{n}, w_1(n) = 1 - w_2(n)$$

and the algorithm sets the latency for the synapse maintenance $n_0=10$, to wait synapse weights (the first order statistics) to get good estimates first through the first $n_0$ updates before the standard deviation $\sigma_i$ (the second order statistics) can have reasonable observations. The default estimate for $\sigma_i$, $1/\sqrt{12}$, is needed at early ages.

Each neuron should dynamically determine which synapse should keep active and which synapse should be retracted depending the goodness of match.

The expected goodness of match is indicated by the expected uncertainty, which involves a type of neuro-modulator called Acetylcholine (Ach). The expected synaptic deviation among all the synapses of a neuron is defined by:

$$\bar{\sigma}(n) = \frac{1}{d}\sum_{i=1}^{d} \sigma_i(n). \quad (5)$$

where we assume that we have only a single section of input b, I, t. We define the relative ratio, as novelty, probably represented by Norepinephrine (NE) (9):

$$r_i(n) = \frac{\sigma_i(n)}{\bar{\sigma}(n)}.$$

We suggest that an increase of NE indicates novelty (e.g., humor).

The algorithm is configured to retract synapse i if $\sigma_i(n)$ is large. However, it is preferable not to have a hard threshold that may cause a synapse to be retracted and extracted repeatedly. For this reason, the algorithm employs a smooth synaptogenic factor f(r) defined by the Mahalanobis distance, instead of the Euclidean distance.

Suppose that $\hat{w}=(\hat{w}_1, \hat{w}_2, \ldots, \hat{w}_d)$ is an approximation of a random vector $w=(w1, w2, \ldots, wd)$. The Mahalanobis distance between them is $$\|\hat{w} - w\|_m = \sqrt{\sum_{i=1}^{d} \frac{(\hat{w}_i - w_i)^2}{\sigma_i^2}}.$$

where $\sigma_i^2$ is the variance of $w_i$.

In other words, each component is preferably weighted by the inverse of the standard deviation $\sigma_i$. However, as the estimated standard deviation may be unstable at the beginning, the momentum in Eq. (4) is important. When the standard deviation is particularly large, the component should be completely cut. Furthermore, we would like to have a continuous profile for the synaptogenic factor $f$, especially the point where the input component is cut. We adopt the following synaptogenic factor for each component of the input p vector:

$$f(\sigma, \tilde{\sigma}) = \begin{cases} \dfrac{1}{\sigma+\epsilon} - \dfrac{1}{\xi\tilde{\sigma}+\epsilon} & \text{if } \sigma/\tilde{\sigma} \leq \xi \\ 0 & \text{otherwise} \end{cases} \quad (6)$$

where $\xi \approx 1.5$ to determine how far the deviation $\sigma$ must be, relative to $\bar{\sigma}$ to be treated as an outlier; $\epsilon=\delta/\sqrt{12}$ and $\delta=1/256$ to avoid the denominator to become zero. The second term for the case $\sigma/\bar{\sigma} \leq \xi$ is for $f$ to reach zero when $\sigma/\bar{\sigma}=\xi$ so that $f$ is continuous in $\sigma$.

The above trimming uses a modified Mahalanobis distance within the small variation and cuts off outliers completely beyond a certain range $\xi$.

Trimming

Trimming can be considered the maintenance of spine-synapse combination. We would like to define the trimming of $v=v_2, v_d$) to be $$v_i \leftarrow f_i v_i \quad (7)$$

$i=1, 2, \ldots, d$. Similarly, trim the input vector $p=(p_1, p_2, p_d)$ where $p=(b, l, t)$.

Having described certain background motivational factors and data normalization considerations, the area function that includes synaptic maintenance (algorithm 3) will now be described.

Algorithm 3 (Area Function with Synaptic Maintenance)

The synaptic maintenance process has been illustrated in FIG. 6. Steps 40-52 comprise operations performed by each neuron. Step 54 implements the top-k competition mechanism, whereby the winning neurons are selected. Steps 58, 62 and 66 are then performed only by the winning neurons.

The synaptic maintenance process proceeds as follows:

1. Every neuron performs first the range normalization (for minimum 0 and maximum 1) based on the input field and then the $\epsilon$-mean normalization for each of b, I and t, respectively, of the input vector p=(b, I, t), unless the input vector is a scalar. This is depicted at step 42.

2. Every neuron trims its b, I, t, $v_b$, $v_I$, $v_t$, respectively, using the synaptogenic factors. This is depicted at step 44.

3. Every neuron performs the range normalization again based on input components where synaptogenic factors are non-zero. This is depicted at step 46. Then, perform the $\epsilon$-mean normalization for its trimmed b, I and t, of the input vector p=(b, I, t). This is depicted at step 46. Compute the $\epsilon$-mean versions of $v_b$, $v_I$ and $v_t$, respectively. This is depicted at step 50. Note that this pass of $\epsilon$-mean can be very different from the first $\epsilon$-mean because of the trimming (re-weighting).

4. Every neuron computes the pre-action potential using inner products of the $\epsilon$-mean versions:

$$r(b, I, t, v_b, v_I, v_t) = \alpha\left(\frac{b}{\|b\|} \cdot \frac{v_b}{\|v_b\|}\right) + \beta\left(\frac{1}{\|I\|} \cdot \frac{v_I}{\|v_I\|}\right) + \gamma\left(\frac{t}{\|t\|} \cdot \frac{v_t}{\|v_t\|}\right) \quad (8)$$

where $\alpha>0$, $\beta>0$, $\gamma>0$ with $\alpha+\beta+\gamma=1$ and the denominators are never zero because of the 2nd $\epsilon$-mean normalization in the step 3 above. The default values for $\alpha$, $\beta$, $\gamma$ are $\alpha=\beta=\gamma=1/3$. Note: each term corresponds to a correlation coefficient, but the denominators are never zero. This is depicted at step 52.

5. Conduct top-k competition for all neurons in the area. This is depicted at step 54.

6. Only the winner neurons conducts Hebbian learning to update its synaptic weight vector using its normalized firing value $r_j$ and its own untrimmed input p. This is depicted at step 58. Other neurons do not fire, as indicated at 60.

7. Only the winner neurons update $\sigma_i$ for each synapse and advance their age. This is depicted at step 62. Other neurons do not update, as indicated at 64.

8. Only the winner neurons update the synaptogenic factors for all its synapses. This is depicted at step 66. Other neurons do not update, as indicated at 68.

We can see that the synaptogenic factor can indicate the contour of the object, i.e., segmentation, if the object views for which the neuron is the winner have little variation. This is the case where Y has many neurons, so that each neuron is only responsible for a small Voronoi region in the neuronal input space.

The background components will hopefully be cut completely since they tend to have larger variations, larger than the components of the foreground objects.

Change of the Maintenance is Bi-Directional

It is important that the Hebbian learning is based on the untrimmed spine-synapse vector v and the untrimmed pre-synaptic input vector p, since the synaptogenic factor $f(\sigma/\bar{\sigma})$ needs to use un-trimmed v and x to dynamically increase or decrease the amount of trimming. Otherwise, once a pre-synaptic component is cut, it is unknown and there is no mechanisms to get it back when it matches better.

Without Using Internal Supervision (Truly Closed Skull)

Synapse maintenance explained above enables the DN to be fully autonomously developed inside its truly closed skull, with only its sensory port X and the effector motor Z open to the external world. In early Where-What Networks (WWN), WWN-1 through WWN-5, there is a pulvinar, which is supposed to be developed earlier, so that it can be used to roughly identify the region (e.g., 3×3×8) inside Y that are responsible for the foreground area. When we used pulvinar during training, we assumed that the pulvinar provides a rough attention information, which is consistent with the ground truth. This mechanism presents Y neurons to learn backgrounds. This is because other regions inside Y are totally suppressed by the pulvinar since they sense the current background. The method of synapse maintenance here enables DN to develop without a need for the assumed, probably developed, pulvinar. In this sense, the pulvinar is used to roughly supervise the Y area.

In this invention, we have realized our goal to train the DN without supervising attention in Y during training. The environment only supervises the sensory port X and the effector port Z, whenever the teacher feels like it. Otherwise, the DN generates its actions from Z fully autonomously while its action and the environment jointly result in the sensory images for the DN.

All Y neurons sample two subspaces X and Z, where the scale of receptive field in X is limited depending on the default scale of the ascending receptive field for each neuron (probably in different internal area). We assume the full initial connections between each Y neuron and the Z area.

Figure 6A:
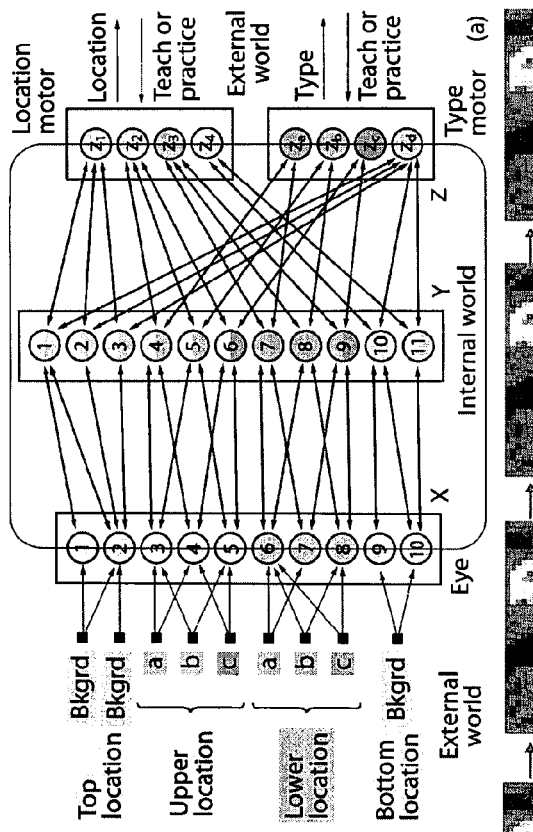
FIG. 6a is a schematic description of a simple developmental network configured to analyze visually perceptible information.
Figure 6B:
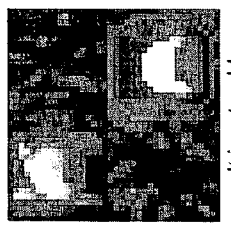
FIG. 6b depicts intent-free and intent-directed perception by a larger developmental network.
Figure 6B:
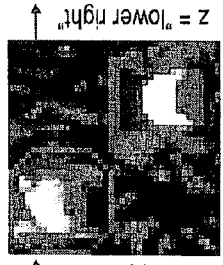
Figure 6B:
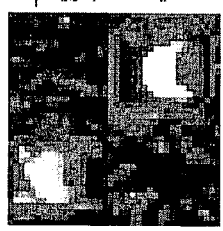
Figure 6B:
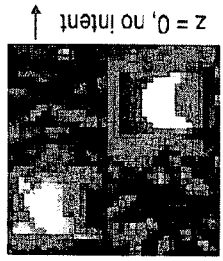
Figure 6B:
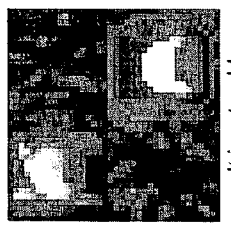
Figure 6B:
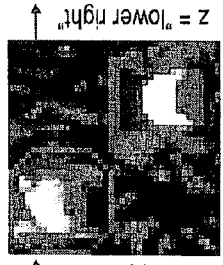
Figure 6B:
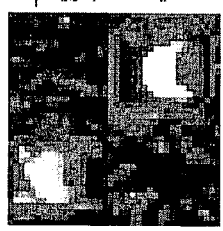
Figure 6B:
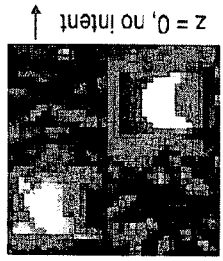

Referring to FIG. 6a, there is illustrated a schematic description of a simple DN. The illustration for each neuron in Y indicates that the feature neuron matches two components, ascending sensory information (upper location) and descending motor information (lower location). Lateral connections are not shown for simplicity. FIG. 6b shows intent-free and intent-directed perception by a larger DN. Each intent, shown on the vertical axis, emerges from, or supervised on, one Z area (location or type). The behavior outputs, shown on the horizontal axis, emerge from another Z area (in FIG. 6a, the ascending sensory information).

Principles

The role of a neuron is assigned by the experience. Suppose each neuron does not have lateral excitatory input. Consider the pre-response of a neuron:

$$r(b, t, v_b, v_t) = 0.5\left(\frac{b}{\|b\|} \cdot \frac{v_b}{\|v_b\|}\right) + 0.5\left(\frac{t}{\|t\|} \cdot \frac{v_t}{\|v_t\|}\right). \quad (9)$$

The above indicates that the pre-action potential has two parts, the first term indicates the bottom-up energy and the second term indicates the top-down energy. In order to win, the neuron must match well for both the bottom-up part and the top-down part. Suppose (a) that the Z area is supervised by the location of a foreground object via LM and by the type of the object via TM and both supervisions are correct; and (b) there is only one foreground object in the cluttered science. There are several cases to discuss:

1. Wrong type, wrong location: This neuron is sensing a background patch, which is not of the correct type nor at the correct location.

2. Correct type but wrong location: It has 50% of top-down energy but its bottom-up energy is low because the background patch does not match its weight well.
3. Wrong type but correct location: It has 50% of top-down energy but its bottom-up energy is low because the background patch does not match its weight well either.
4. Correct type, correct location: This neuron has nearly 100% top-down energy and nearly 100% of bottom-up energy.

From the above discussion, we can see that only the neuron that best match its correct type and best match its location can fire.

Cell Genesis:

After its genesis, a neuron starts from the initial state, called Initial State Neuron (ISN). An ISN is very plastic so that it can quickly use the input vector p to re-initialize its weight vector with its age always to be zero. An ISN is changed to Learning State Neuron (LSN) if it has won, so that after its first learning its age becomes n=1. Accordingly, to accommodate the ISN concept, we have the following modified learning rate schedule:

Learning Rate:

The Hebbian leaning of a neuron is given by:

$$v(t+1)=(1-w(n))v(t)\ w(n)r\dot{p}(t).$$

where r is the response of the neuron (0 or 1), w(n) is the learning rate:

$$w(n) = \begin{cases} 1 & \text{if it is a } ISN \\ 1/n & \text{if it is a } LSN \text{ with } n \leq n_1 \\ 1/n + (c/n)(n-n_1)/(n_2-n_1) & \text{if it is a } LSN \text{ with } n_1 < n \leq n_2 \\ (1+c)/n + r(n-n_2)/n & \text{if it is a } LSN \text{ with } n_2 < n. \end{cases} \quad (10)$$

where c=2, $n_1$=20, $n_2$=200, r=20000 in our experiments.

Training without Supervising Y

There are a few possible choices of training sessions, some are less natural and some are more natural. Suppose the TM and LM both supervise the type and location, respectively, of the single object in a cluttered unknown background.

Random Training Sessions:

For n objects, l×l locations, randomly chose one object from n and randomly present the object at one of the l×l locations. In each frame, a new natural background is behind the object. This setting is best for initialization of neurons but not very natural.

Type Training Sessions:

Randomly choose one object from n. Sweep the object across different locations against a fixed or moving cluttered background. A different sweeping trajectory uses a different background. This simulates a baby who holds a toy and moves it across his field of view.

Location Training Sessions:

At the same location, loop through different objects. A different object uses a different background. This simulates the case where one can hold a different object in a different time or a different setting. This simulates the case where the teacher calls the attention of the baby by showing an object. However, it is typical that the baby will turn his eyes toward the object, making the object to appear near its fovea (image center). Some objects do not uniformly appear at all possible locations. For example, the sky and roof are typically at top of the field of view.

Practice Sessions:

A practice session is the same as above, except that the object and location combination has been learned before. If the DN has a limited resource, its performance may not be perfect during such practice sessions. However, the optimization results indicate that the DN tends to use the limited neuronal resource (space resource) and learning experience (time resource) for the best possible performance.

From the foregoing it will be appreciated that the synapse maintenance technique can be advantageously applied to a wide variety of different developmental network applications. These include recognizing objects (e.g., human faces), particularly when found in natural images with complicated backgrounds. Such applications are useful in a variety of different surveillance applications, industrial process monitoring applications, vehicular control and driver safety applications, simulation system applications, gaming system applications and the like, which use input from a digital camera device to provide sensory input.

Generally, the synapse maintenance technique has broad applicability, particularly in situations such as the following:

(1) A special object, such as a human face, human hand, or other particular object must be recognized and tracked. Unlike conventional artificial intelligence systems, the developmental network with synapse maintenance does not require the special object to be modeled by hand.

(2) The object being taught natively occurs in a natural background setting. Unlike conventional artificial intelligence systems, there is no requirement to pre-segment the object from the background (e.g., pre-segmenting the face from various natural backgrounds). The developmental network with synapse maintenance can learn directly from the natural settings which include both the object and cluttered backgrounds.

(3) Recognition and segmentation must be solved together, regardless of whether (a) given segmentation recognition is easier or (b) given recognition segmentation is easier.

(4) Batch learning mode using pre-collected images is desired, during which the system must both learn and act interactively (e.g., which image is sensed depends on what the system is now doing. For example, in a vehicular control system the object sensed may need to change depending on whether the vehicle is driving on a freeway vs. navigating through a congested pedestrian marketplace).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of training a neural network comprising:

using a processor and a non-transitory computer readable memory coupled thereto to implement a neural network comprising a plurality of interconnected neurons each having at least one input and at least one synaptic weight value and being arranged in a data structure defining an area;

using the processor to perform synaptogenic trimming on the at least one input of said plurality of interconnected neurons in said area using a synaptogenic factor for each neuron based on standard deviation of a measured match between the input and synaptic weight value;

using the processor to conduct a top-k competition among all neurons in said area to select a subset of said neurons as winning neurons;

using the processor to apply neuronal learning only to said winning neurons to update the synaptic weight values for said winning neurons; and using the processor to update the synaptogenic factor for each winning neuron.

2. The method of claim 1 further comprising using the processor to monitor the state of said at least one input and to generate a new neuron in the case where a new state is detected.

3. The method of claim 1 wherein said data structure is configured such that a plurality of said interconnected neurons each define a bottom-up synapse and a top-down synapse.

4. The method of claim 3 further comprising using the processor to monitor the states of said bottom-up and top-down synapses for each of said plurality of said interconnected neurons and to generate a new neuron in the case where a new bottom-up and top-down state is detected for the first time.

5. The method of claim 1 wherein said processor applies neuronal learning at a defined learning rate, and further comprising using the processor to generating a new neuron and modifying the learning rate for said new neuron such that it learns at a rate differently from existing neurons.

6. The method of claim 1 wherein the synaptogenic factor is based on a computational model implemented by said processor.

7. The method of claim 1 further comprising using the processor to perform range normalization upon said at least one input to place the numeric value of said input within a predefined value range by comparison with inputs of other neurons in said area.

8. The method of claim 7 wherein the processor performs range normalization before synaptogenic trimming.

9. The method of claim 7 wherein the processor performs range normalization after synaptogenic trimming.

10. The method of claim 1 further comprising using the processor to perform $\epsilon$-mean normalization upon the inputs of each of said plurality of interconnected neurons.

11. The method of claim 10 wherein the processor performs $\epsilon$-mean normalization before synaptogenic trimming.

12. The method of claim 10 wherein the processor performs $\epsilon$-mean normalization after synaptogenic trimming.

13. The method of claim 1 wherein said data structure is configured such that a plurality of said interconnected neurons each define a bottom-up synapse, a top-down synapse and a lateral synapse, and wherein said processor performs synaptogenic trimming on each of said bottom-up, top-down and lateral synapses.

14. The method of claim 1 wherein the processor performs synaptogenic trimming based on the inverse of standard deviation of a measured match between the input and synaptic weight value.

15. The method of claim 1 wherein the processor computes a pre-action potential of $\epsilon$-mean normalized versions of said inputs prior to conducting top-k competition.

16. The method of claim 1 wherein said area defined by said data structure is configured as layers, each comprising a network of neurons connected to one another by lateral synapses, and further being connected to neurons within other layers by bottom-up synapses and top-down synapses.

17. The method of claim 1 wherein said data structure defines plural areas, including:
an X area coupled to communicate data with a sensory input device;
a Y area coupled to communicate data with said X area; and
a Z area coupled to communicate data with said Y area and further coupled to a circuit through which training data are input.

18. The method of claim 17 wherein neurons in said Y area receive input from neurons in said X area via bottom-up synapses.

19. The method of claim 17 wherein said neurons in said Y area receive input from neurons in said Z area via top-down synapses.

20. A computer-implemented method of training a neural network comprising:
using a processor and a non-transitory computer readable memory coupled thereto to implement a neural network comprising a plurality of interconnected neurons, each having at least one input and at least one synaptic weight value and being arranged in a data structure defining:
an X area coupled to communicate data with a sensory input device;
a Y area coupled to communicate data with said X area; and
a Z area coupled to communicate data with said Y area and further coupled to a circuit through which training data are input;
using the processor to perform synaptogenic trimming on the at least one input of said plurality of interconnected neurons in at least one of said X, Y and Z areas using a synaptogenic factor for each neuron based on standard deviation of a measured match between the input and synaptic weight value;
using the processor to conduct a top-k competition among all neurons in at least one of said X, Y and Z areas to select a subset of said neurons as winning neurons;
using the processor to apply neuronal learning only to said winning neurons to update the synaptic weight values for said winning neurons; and
using the processor to update the synaptogenic factor for each winning neuron.

21. The method of claim 20 further comprising using the processor to monitor the state of said at least one input and to generate a new neuron in the case where a new state is detected.

22. The method of claim 20 wherein said data structure is configured such that a plurality of said interconnected neurons each define a bottom-up synapse and a top-down synapse.

23. The method of claim 22 further comprising using the processor to monitor the states of said bottom-up and top-down synapses for each of said plurality of said interconnected neurons and to generate a new neuron in the case where a new bottom-up and top-down state is detected for the first time.

24. The method of claim 20 wherein said processor applies neuronal learning at a defined learning rate, and further comprising using the processor to generate a new neuron and to modify the learning rate for said new neuron such that it learns at a rate differently from existing neurons.

25. The method of claim 20 wherein the synaptogenic factor is based on a computational model implemented by said processor.

26. The method of claim 20 further comprising using the processor to perform range normalization upon said at least one input to place the numeric value of said input within a predefined value range by comparison with inputs of other neurons in said area.

27. The method of claim 26 wherein the processor performs range normalization before synaptogenic trimming.

28. The method of claim 26 wherein the processor performs range normalization after synaptogenic trimming.

29. The method of claim 20 further comprising using the processor to perform ϵ-mean normalization upon the inputs of each of said plurality of interconnected neurons.

30. The method of claim 29 wherein the processor performs ϵ-mean normalization before synaptogenic trimming.

31. The method of claim 29 wherein the processor performs ϵ-mean normalization after synaptogenic trimming.

32. The method of claim 20 wherein said data structure is configured such that a plurality of said interconnected neurons each define a bottom-up synapse, a top-down synapse and a lateral synapse, and wherein said processor performs synaptogenic trimming on each of said bottom-up, top-down and lateral synapses.

33. The method of claim 20 wherein the processor performs synaptogenic trimming based on the inverse of standard deviation of a measured match between the input and synaptic weight value.

34. The method of claim 20 wherein the processor computes a pre-action potential of ϵ-mean normalized versions of said inputs prior to conducting top-k competition.

35. The method of claim 20 wherein said areas defined by said data structure are configured as layers, each comprising a network of neurons connected to one another by lateral synapses, and further being connected to neurons within other layers by bottom-up synapses and top-down synapses.

36. The method of claim 20 wherein neurons in said Y area receive input from neurons in said X area via bottom-up synapses.

37. The method of claim 20 wherein said neurons in said Y area receive input from neurons in said Z area via top-down synapses.

38. A computer-implemented neural network apparatus, comprising:
a processor having non-transitory computer readable memory coupled thereto, the processor being programmed to implement a neural network comprising a plurality of interconnected neurons, each having at least one input and at least one synaptic weight value and being arranged in an area data structure stored in said memory to define an area;
said processor being programmed to perform synaptogenic trimming on the at least one input of said plurality of interconnected neurons in said area using a synaptogenic factor for each neuron based on standard deviation of a measured match between the input and synaptic weight value;
said processor being programmed to conduct a top-k competition among all neurons in said area to select a subset of said neurons as winning neurons;
said processor being programmed to apply neuronal learning only to said winning neurons to update the synaptic weight values for said winning neurons; and
said processor being programmed to update the synaptogenic factor for each winning neuron.

39. The apparatus of claim 38 wherein the processor is further programmed to monitor the state of said at least one input and to generate a new neuron in the case where a new state is detected.

40. The apparatus of claim 38 wherein said area data structure is configured such that a plurality of said interconnected neurons each define a bottom-up synapse and a top-down synapse.

41. The apparatus of claim 40 wherein the processor is further programmed to monitor the states of said bottom-up and top-down synapses for each of said plurality of said interconnected neurons and to generate a new neuron in the case where a new bottom-up and top-down state is detected for the first time.

42. The apparatus of claim 38 wherein said processor is programmed to apply neuronal learning at a defined learning rate, and further comprising using the processor to generate a new neuron and to modify the learning rate for said new neuron such that it learns at a rate differently from existing neurons.

43. The apparatus of claim 38 wherein the synaptogenic factor is based on a computational model implemented by said processor.

44. The apparatus of claim 38 further comprising using the processor to perform range normalization upon said at least one input to place the numeric value of said input within a predefined value range by comparison with inputs of other neurons in said area.

45. The apparatus of claim 44 wherein the processor is programmed to perform range normalization before synaptogenic trimming.

46. The apparatus of claim 44 wherein the processor is programmed to perform range normalization after synaptogenic trimming.

47. The apparatus of claim 38 wherein the processor is further programmed to perform ϵ-mean normalization upon the inputs of each of said plurality of interconnected neurons.

48. The apparatus of claim 47 wherein the processor is programmed to perform ϵ-mean normalization before synaptogenic trimming.

49. The apparatus of claim 47 wherein the processor is programmed to perform ϵ-mean normalization after synaptogenic trimming.

50. The apparatus of claim 38 wherein said data structure is configured such that a plurality of said interconnected neurons each define a bottom-up synapse, a top-down synapse and a lateral synapse, and wherein said processor is programmed to implement synaptogenic trimming on each of said bottom-up, top-down and lateral synapses.

51. The apparatus of claim 38 wherein the processor is programmed to perform synaptogenic trimming based on the inverse of standard deviation of a measured match between the input and synaptic weight value.

52. The apparatus of claim 38 wherein the processor is programmed to compute a pre-action potential of ϵ-mean normalized versions of said inputs prior to conducting top-k competition.

53. The apparatus of claim 38 wherein said area defined by said data structure is configured as layers, each comprising a network of neurons connected to one another by lateral synapses, and further being connected to neurons within other layers by bottom-up synapses and top-down synapses.

54. The apparatus of claim 38 wherein said data structure defines plural areas, including:
an X area coupled to communicate data with a sensory input device;
a Y area coupled to communicate data with said X area; and
a Z area coupled to communicate data with said Y area and further coupled to a circuit through which training data are input.

55. The apparatus of claim 54 wherein neurons in said Y area receive input from neurons in said X area via bottom-up synapses.

56. The apparatus of claim 54 wherein said neurons in said Y area receive input from neurons in said Z area via top-down synapses.

57. The apparatus of claim 38 further comprising a digital camera device coupled to said processor to provide sensory input to said network.

58. A surveillance apparatus that includes at least one digital camera device that supplies sensory input that is processed by the apparatus of claim 38.

59. A vehicular control apparatus that includes at least one sensory input that is processed by the apparatus of claim 38.

60. An industrial process monitoring apparatus that includes at least one process monitoring input that is processed by the apparatus of claim 38.

\* \* \* \* \*